United States Patent [19]
Glovan et al.

[11] Patent Number: 5,484,244
[45] Date of Patent: Jan. 16, 1996

[54] SELF-LOCKING THREADED FASTENERS

[75] Inventors: Ronald J. Glovan; John C. Tierney; Leroy L. McLean; Lawrence L. Johnson, all of Butte, Mont.

[73] Assignee: MSE, Inc., Butte, Mont.

[21] Appl. No.: 192,696

[22] Filed: Feb. 7, 1994

[51] Int. Cl.⁶ ............ F16B 35/04; F16B 37/16; B23P 11/02
[52] U.S. Cl. .......... 411/424; 411/433; 411/436; 411/902; 411/909; 29/447
[58] Field of Search ............... 411/411, 424, 411/427, 436, 901, 902, 909, 914, 433; 285/381; 29/447

[56] References Cited

U.S. PATENT DOCUMENTS

| | | | |
|---|---|---|---|
| 3,416,823 | 12/1968 | Auer | 411/909 X |
| 4,198,081 | 4/1980 | Harrison et al. | 285/381 |
| 4,619,568 | 10/1986 | Carstensen | 411/909 X |
| 4,880,343 | 11/1989 | Matsumoto | 411/909 X |
| 5,133,631 | 7/1992 | Beach | 411/909 X |
| 5,265,456 | 11/1993 | Kennedy et al. | 29/447 X |
| 5,366,331 | 11/1994 | Erbes | 411/909 X |

*Primary Examiner*—Neill R. Wilson
*Attorney, Agent, or Firm*—Peter Tribulski

[57] ABSTRACT

A threaded fastener with a shape memory alloy (SMA) coatings on its threads is disclosed. The fastener has special usefulness in high temperature applications where high reliability is important. The SMA coated fastener is threaded into or onto a mating threaded part at room temperature to produce a fastened object. The SMA coating is distorted during the assembly. At elevated temperatures the coating tries to recover its original shape and thereby exerts locking forces on the threads. When the fastened object is returned to room temperature the locking forces dissipate. Consequently the threaded fasteners can be readily disassembled at room temperature but remains securely fastened at high temperatures.

A spray technique is disclosed as a particularly useful method of coating of threads of a fastener with a shape memory alloy.

4 Claims, 8 Drawing Sheets

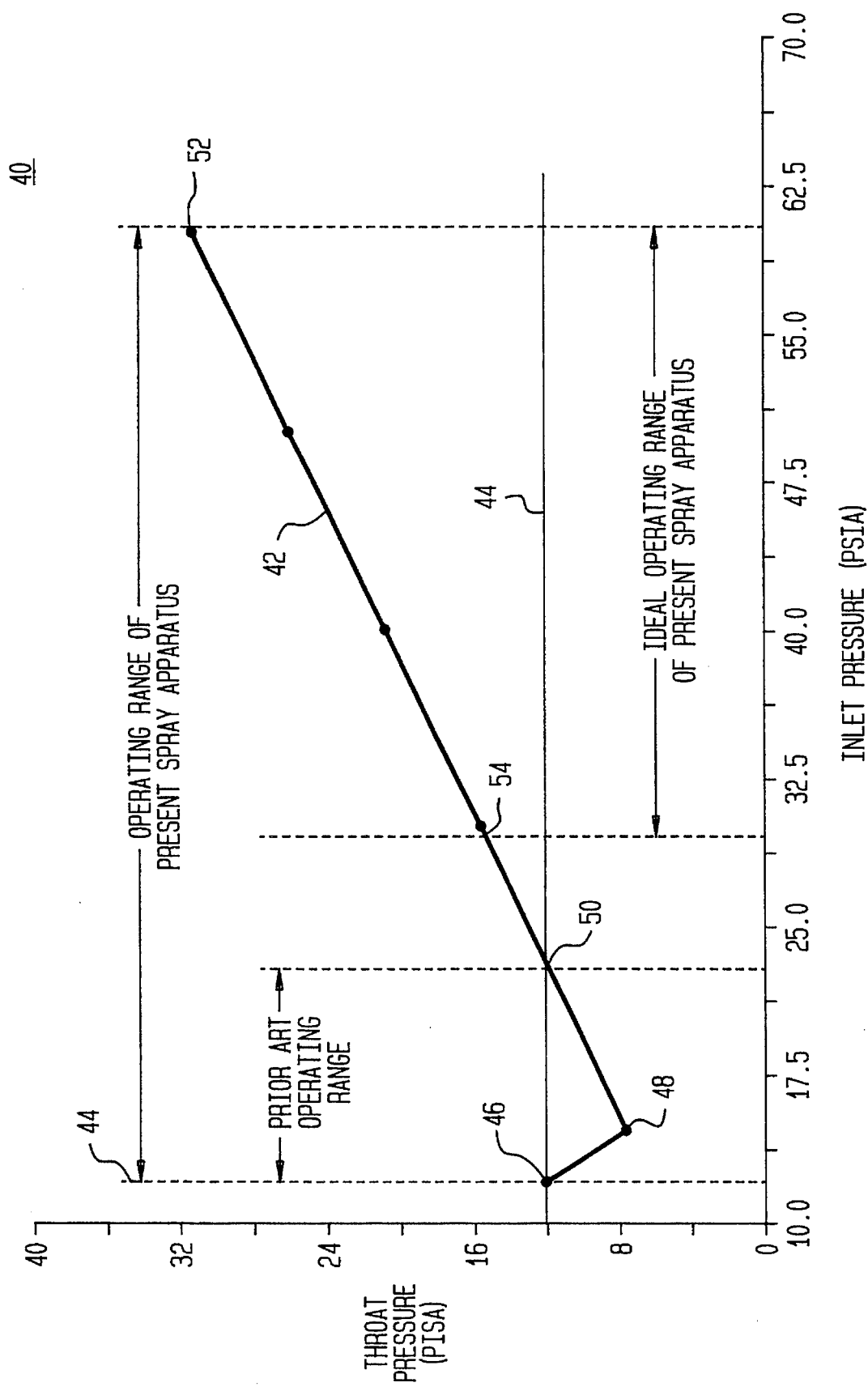

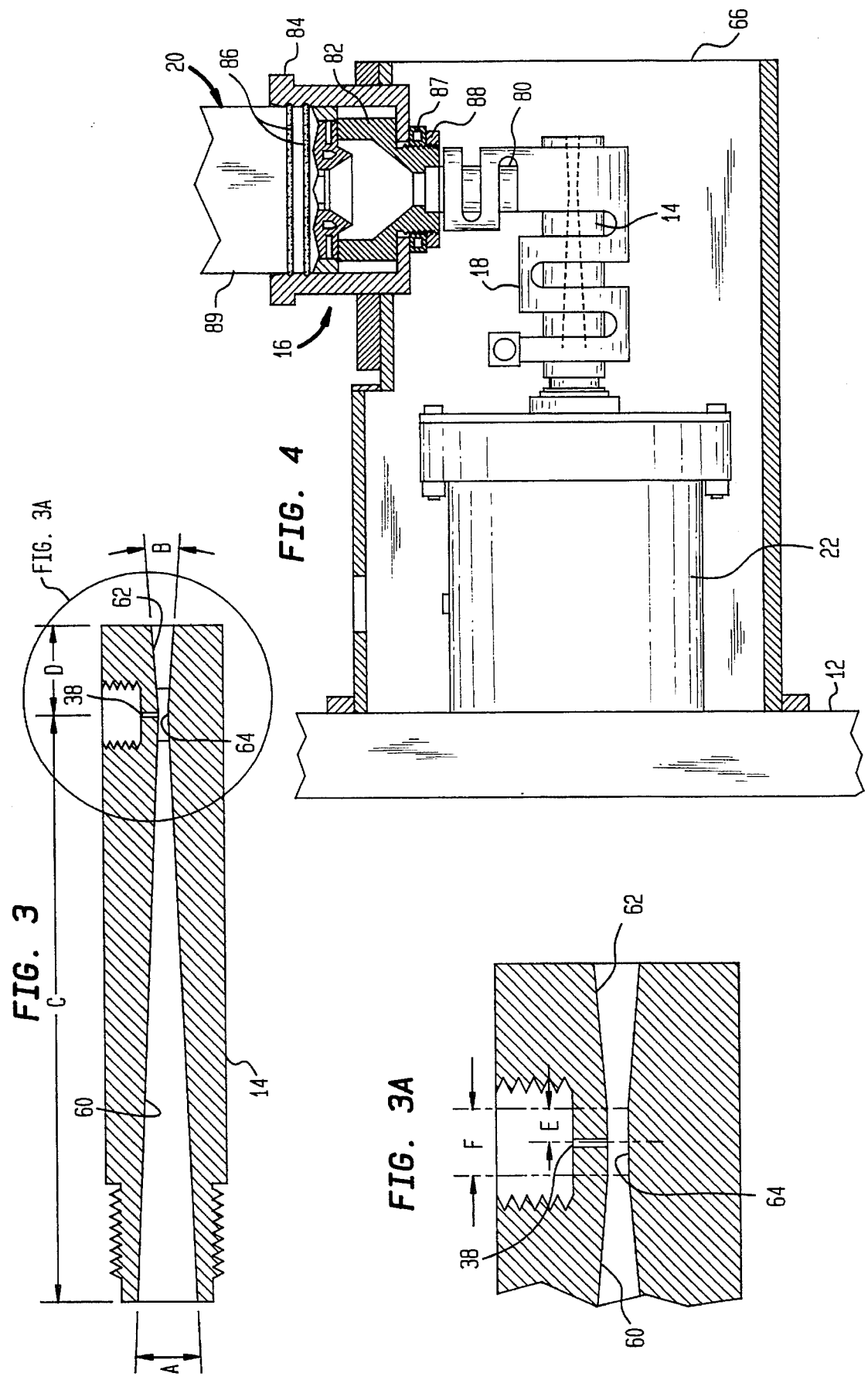

5,484,244

SELF-LOCKING THREADED FASTENERS

CONTRACTUAL ORIGIN OF THE INVENTION

This invention was made with United States Government support under Contract No. DE-AC22-88ID12735 awarded by the Department of Energy. The Government has certain rights in this invention.

CROSS REFERENCE TO RELATED PATENT APPLICATIONS

The present invention is related to two co-pending U.S. Patent Applications. A first related application (Ser. No. 08/192,691) entitled "Method and Apparatus for Spraying Molten Materials", has a common assignee with the present patent application. The first application was filed concurrently with the present application and has as its inventors, R. J. GLOVAN, J. TIERNEY, L. JOHNSON, L. MCLEAN, G. NELSON, & Y. M. LEE. A second related application (Ser. No. 08/192,697) entitled "Heater for Metal Spray Apparatus" has a common assignee with the present patent application. The second application is being filed concurrently with the present patent application and has as its inventors, R. J. GLOVAN, J. TIERNEY, L. JOHNSON, L. MCLEAN & D. VERBAEL.

FIELD OF THE INVENTION

The invention relates to self-locking threaded fasteners.

BACKGROUND OF THE INVENTION

In many instances, there is a need to fasten two objects together so that they can be subsequently separated without destruction of either of the objects. This problem has been solved imperfectly by the use of threaded fasteners. There are many threaded fasteners which have a self-locking feature, but there are none with the degree of reliability which results from a riveted or welded connection between objects. It has been a long sought after goal to provide a threaded fastener which will operate with the reliability of a riveted or welded connection. This need for reliability is particularly acute where assembled objects operate at high temperatures. Typical high temperature applications such as engines and turbines are ones in which assembled parts are heated during operation of the engine or turbine and then cooled when the engine or turbine is not operating. This temperature cycling produces severe expansion and contraction of a threaded fastener. The cyclical expansion and contraction takes a toll on fastener reliability.

Many prior art self-locking threaded fasteners rely on elastomeric inserts as locking devices. These fasteners are unsuitable for high temperature applications, i.e., temperatures above 200 degrees centigrade. When these fasteners are exposed to high temperatures such as those encountered in a turbine, the elastomeric inserts are useless because they disintegrate.

Another problem that develops with threaded fasteners in high temperature settings is corrosion. Typically, the fastener is made from a material that is dissimilar to the objects being held together. Virtually any dissimilarity between adjacent metal at high temperature will result in corrosion. When a threaded fastener corrodes, it loses some of its strength. Corrosion of a fastener also creates an undesirable adhesion between the threads of the fastener and the objects being fastened. Consequently, when the time comes to disassemble the secured objects, it is often the case that the fastener will not unthread from the object but will instead break away inside the object.

It is desirable therefore to provide a self-locking fastener that is highly reliable when securing objects at a high temperature but will be readily releasable when the objects are at a low temperature. It is also desirable that such a fastener can be produced in an expedient and cost effective manner.

SUMMARY OF THE INVENTION

The present invention is directed to a producing a threaded fastener with a coating of shape memory alloy on its threads. When the fastener is inserted at a low temperature, the coating readily distorts. When the fastener is raised to a higher temperature, the coating changes its crystal structure and produces a locking stress on the fastener. When the fastener is cooled the locking stress is relieved and the fastener is readily removable.

Viewed from one aspect the present invention is directed to a threaded fastener which comprises a threaded member and a coating of shape memory alloy on the threads of the member.

Viewed from another aspect, the present invention is directed to a male threaded fastener that comprises a threaded base member having thread dimensions which are no larger than a corresponding opening in a female threaded opening into which the base member is to be inserted. A coating of shape memory alloy is applied to the threads of the base member, which coating has a thickness sufficient to produce an interference fit between the male threaded fastener and the female threaded opening into which the male threaded fastener is to be inserted.

Viewed from yet another aspect, the present invention is directed to a method of producing a threaded self-locking fastener. The method comprises the steps of producing a spray plume of droplets of molten shape memory alloy and placing the threaded fastener into the spray plume to coat the threads of the fastener with the shape memory alloy.

Viewed from still another aspect, the present invention is directed to a method of fastening a female threaded object into a desired location which location is intended to be exposed to temperatures above 100 degrees centigrade. The method comprises the steps of determining the inside diameter of the female threads, coating threads of a male threaded fastener with a shape memory alloy so that the overall outside diameter of the coated threads exceeds the inside diameter of the female threads, and inserting the coated male threaded fastener into the female threaded object at a temperature below 35 degrees centigrade whereby the coating of shape metal alloy is distorted and will subsequently produce a locking stress on the female object when the female object is heated to a temperature above 100 degrees centigrade.

The invention will be better understood from the following detailed description taken in consideration with the accompanying drawings and claims.

BRIEF DESCRIPTION OF THE DRAWINGS

FIG. 2 shows a comparative graphical relationship between inlet pressure and throat pressure in prior art apparatus and the apparatus of FIG. 1;

FIG. 3 shows a sectional view of a nozzle that is used in the apparatus of FIG. 1;

FIG. 3A is a detailed view of a portion of the nozzle of FIG. 3;

FIG. 4 shows an elevational, partially sectioned view of a portion of the apparatus of FIG. 1;

The drawings are not necessarily to scale.

DETAILED DESCRIPTION

Figure 1:
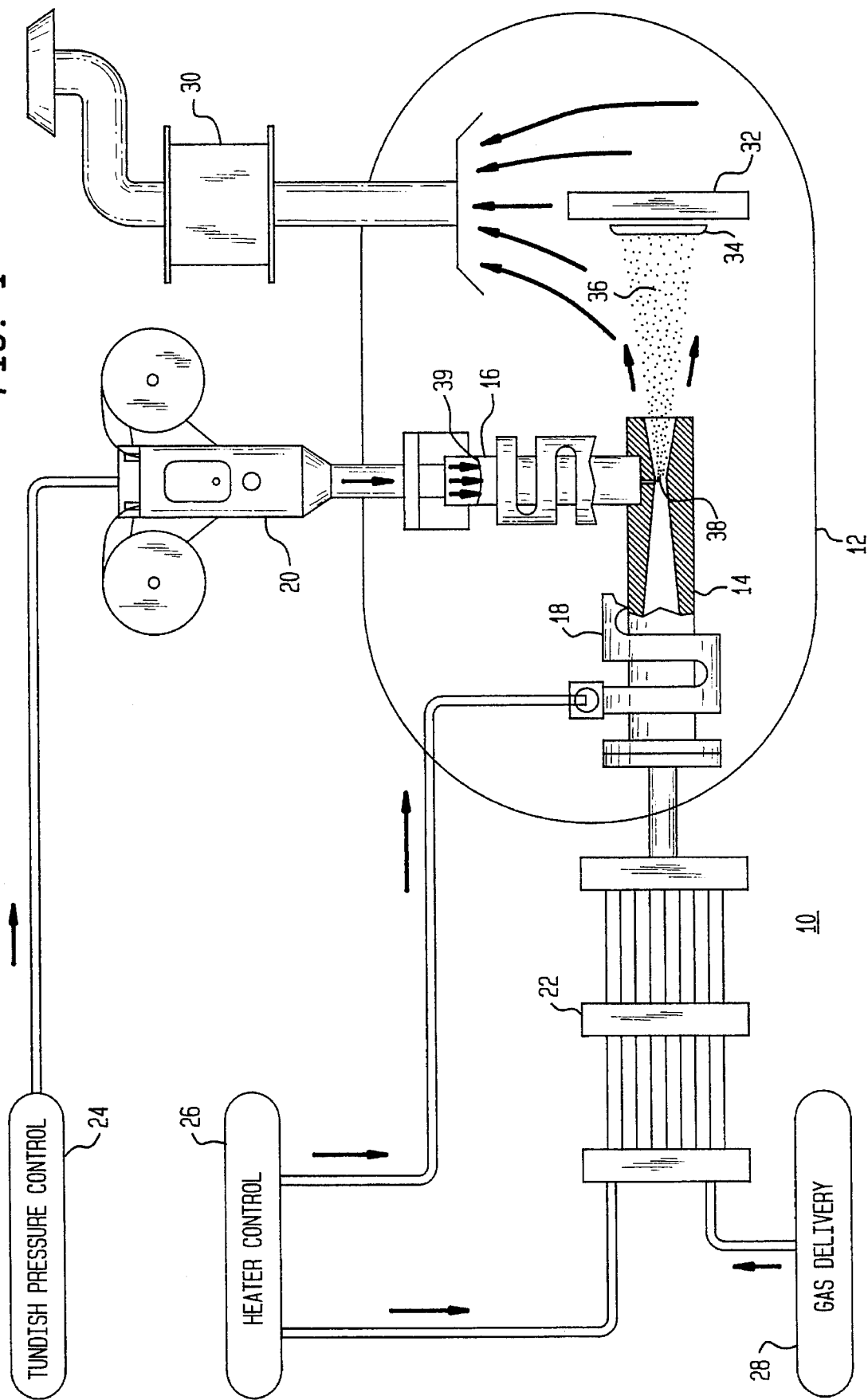
FIG. 1 shows, symbolically, a metal spray apparatus which is useful in producing objects in accordance with the apparatus 10.

Referring now to FIG. 1, there is shown symbolically a metal spraying apparatus 10 that is useful in producing fasteners in accordance with the present invention. The apparatus 10 comprises a chamber 12, a nozzle 14 (shown partially sectioned for purposes of clarity), a tundish assembly 16 (shown partially sectioned for purposes of clarity), a heater 18 (shown partially removed for purposes of clarity), a metal source unit 20, a gas heater 22, a tundish pressure control unit 24, a heater control unit 26, a gas delivery unit 28, an exhaust unit 30 and a substrate support 32. The substrate support 32 holds an object to be sprayed or a substrate 34 within a spray plume 36.

The tundish assembly 16 and the metal source unit 20 are coupled to the nozzle 14. The heater 18 surrounds the nozzle 14 and the tundish assembly 16. The nozzle 14, the tundish assembly 16, the heater 18, and the substrate support 32 are enclosed within the chamber 12. The gas heater 22 is coupled to the nozzle 14 through a wall of the chamber 12. The metal source unit 20 is coupled to the tundish assembly 16 through a wall of the chamber 12. The chamber 12 is adapted to maintain a desired ambient pressure therein. The exhaust unit 30 is coupled to the chamber 12 and is adapted to withdraw and filter exhaust gases from the chamber 12. The tundish pressure control unit 24 is coupled to the metal source unit 20 The heater control unit 26 has a first output coupled to the heater 18 and a second output coupled to the gas heater 22. The gas delivery unit 28 is coupled to an input end of the gas heater 22.

In operation, the metal spraying apparatus 10 produces a spray plume 36 of uniformly sized droplets of liquid metal which are propelled against a surface of the substrate 34 to produce a coating of metal on the substrate 34. The plume 36 is produced as gas flows from the gas delivery unit 28 through the gas heater 22 and through the nozzle 14. Metal is introduced into the gas through a port 38 which interconnects an interior of the nozzle 14 with an interior of the tundish assembly 16. Within the interior of the tundish assembly 16, there is a pool 39 of liquid metal which is generated by the metal source unit 20. The heater 18 maintains the temperature of the nozzle 14 and the tundish assembly at a high enough level so that liquid metal produced by the metal source unit 20 remains in a molten state. The nozzle 14 has a converging-diverging configuration and is capable of accelerating gas from a sub-sonic to a super-sonic velocity. The port 38 which interconnects the interior of the tundish assembly 16 with the interior of the nozzle 14 is positioned at a point in the nozzle 14 where the shape of the nozzle 14 changes from a converging to a diverging cross-section. This arrangement results in the production of liquid metal droplets which have a very uniform size. These highly uniform droplets exit the nozzle in the form of the plume 36 which deposits a uniform coating of the metal on the substrate 34.

The tundish pressure control unit 24 produces a static pressure on the pool 39 of the liquid metal that is held in the tundish assembly 16. As the static pressure is increased, the droplets of metal within the plume 36 are increased in size. Conversely, when the static pressure from the tundish pressure control unit 24 is decreased, the droplet size within the plume 36 is reduced. Even though the droplet size can be changed from large to small, the droplet size uniformity does not change. For example, if at a given static pressure of 1800 mm Hg the droplet size in the plume 36 is nominally 10 microns, the variation in size of any one droplet relative to all the other droplets is no greater than about 10 percent. Similarly, if at a static pressure of 2000 mm Hg, the droplet size in the plume 36 is 15 microns, the variation in size from one droplet to all other droplets in the plume 36 is no greater than about 10 percent.

The achievement of this type of control provides a marked departure over prior art systems. In prior art systems such as conventional twin wire arc systems, a spray plume is generated with droplets which vary in size relative to one another 500 percent or more. In other prior art spraying systems such as that disclosed in U.S. Pat. No. 4,919,853 (Alvarez et al.) issued Apr. 24, 1990 the spray droplets are uniform in size, but the Alvarez et al. spraying system cannot be readily adapted to produce a relatively large droplet spray for one application and a smaller droplet spray for some other application in which a smaller droplet spray is more suited. The apparatus 10 is uniquely capable of producing spray plumes with uniformly sized droplets with a large range of selected diameters with a wide range of droplet velocities. This flexibility is achieved because the apparatus 10 can be operated with a wide range of gas flow rates.

Because of this flexibility, it is possible to employ the apparatus 10 to produce metal powders of uniform size. This can be done by spraying metal into the chamber 12 and allowing the metal droplets to freeze before they strike an object or substrate.

Referring now to FIG. 2, there is shown a graph 40 that displays differences in operating parameters between the apparatus 10 and the prior art as embodied in the Alvarez et al. patent. A graph line 42 depicts a relationship between inlet pressure at an inlet end of a converging-diverging nozzle and throat pressure at a selected point in a throat of the nozzle. A horizontal line 44 represents a typical ambient pressure within a chamber in which the nozzle is located. It can be seen that when the inlet pressure is equal to the ambient pressure, the throat pressure is also equal to ambient pressure as shown at a point 46. As the inlet pressure increases, the throat pressure decreases to a minimum at point 48. Increasing inlet pressure eventually produces a condition in which the throat pressure is once again at ambient pressure. This is shown at a point 50. The nozzle of the Alvarez et al. patent must operate within a range of inlet pressures shown between the points 46 and 50. These points represent the range of inlet pressures which will produce throat pressures below ambient pressure. In other words, points 46 and 50 show the range of operation of a nozzle which is dependent upon aspiration for its operation.

The nozzle 14 of the apparatus 10 is operable throughout the entire range of pressures shown between the point 46 and a point 52. It has been found that an ideal range of operating conditions for the nozzle 14 of the apparatus 10 is shown between a point 54 and the point 52. The nozzle 14 is not dependent on the principle of aspiration for its operation. Because a negative throat pressure is not required, the inlet pressure can be increased substantially above ambient pressure. Additionally, the pressure can be varied widely. This variability of inlet pressure produces great flexibility in the flow rate of gas through the nozzle 14. This flexibility in choice of flow rate provides an opportunity to choose a flow rate which produces an optimum particle size and particle velocity for every coating application.

Because the molten metal is independently pressurized, the metal can be injected at higher pressures. This enhances atomization and mixing by assuring that the droplets penetrate further into the gas flow through the nozzle 14. By extending the range of nozzle inlet pressures, substantially higher gas and droplet velocities can be achieved at the exit of the nozzle 14. Since adhesion strength and density generally improve as droplet velocity increases, this feature enhances the quality of a sprayed coating produced by the apparatus 10.

In order to assure repeatability and uniformity of operating characteristics of the apparatus 10, the chamber 12 is maintained at a controlled ambient pressure. The controlled ambient pressure in the chamber 12 allows the apparatus 10 to function independently of local atmospheric conditions.

Because of inherent flexibility of the apparatus 10, we have found that a single configuration of the nozzle 14 of FIG. 1 is suitable for a wide range of applications.

Referring now to FIGS. 3 and 3A there is shown a cross-sectional view of the nozzle 14. The nozzle comprises a conical converging section 60, a conical diverging section 62 and a cylindrical throat section 64. The port 38 enters the throat section 64. It has been found that suitable material for the nozzle 14 is boron nitride. FIG. 3 shows a series of dimensional relations indicated with the letters A through F. The nozzle 14 has been found to perform effectively within the following ranges of the dimensions A through F:

A between about 2 degrees and 7 degrees;

B between about 3 degrees and 7 degrees:

C between about 4 inches and 7 inches

D between about 0.5 inches and 0.75 inches;

E between about 0.04 inches and 0.05 inches;

F between about 0.08 inches and 0.12;

We have found that the diameter of port 38 can be between about 0.008 and 0.012 inches. We have also found that the centerline of the port 38 should be located at a midpoint of the throat section 62 or toward the exit end thereof.

Referring now to FIG. 4 there is shown a detailed, partially sectioned elevational view of an embodiment of the apparatus 10. A portion of the metal source unit 20 of FIG. 1 is in contact with the tundish assembly 16. The tundish assembly 16, the nozzle 14 and the heater 18 are encased in an insulator 66. The insulator 66 is formed from a material known as rigidized carbon felt. This material is available as a commercial product from companies such as Polycarbon Inc of Valencia, Calif. The gas heater 22 of FIG. 1 extends through a wall of the chamber 12.

The heater 18 is formed of a single piece of graphite in a serpentine configuration that effectively surrounds the nozzle 14 and a lower portion of the tundish assembly 16. A more detailed description of the heater 18 is provided hereinbelow in connection with a discussion of FIG. 5.

The tundish assembly 16 is comprised of a tundish 80, an inner metal source adapter 82, an outer metal source adapter 84, a set of o-rings 86, a water-cooled ring 87 and a threaded fastener 88. It can be seen that an upper portion of the outer metal source adapter 84 projects out of the insulator 66. During operation, this upper portion remains in contact with a lower end 89 of the metal source unit 20. In the case of the embodiment of the invention shown in FIG. 1, the metal source unit 20 is a conventional twin wire arc unit such as a Model 9000 manufactured and sold by Hobart/Tafa of Concord, N.H. In this type of twin wire arc unit, the lower end 89 of the unit 20 is water cooled. This water cooled feature of the unit 20 is used advantageously in the apparatus 10. When the water cooled lower end 89 is placed into contact with the outer metal source adapter 84, the adapter 84 transfers its stored heat to the unit 20. The water-cooled ring 87 provides additional cooling. Thus the portion of the adapter 84 which projects out of the insulator 100 remains relatively cool. Because this projecting portion of the adapter 84 remains cool, the adapter can be fitted with conventional o-rings 86 and the o-rings 86 do not melt. Thus an effective pressure seal between the unit 20 and the tundish assembly 16 can be maintained. This is of critical importance in the apparatus 10 because it is necessary to maintain a desired static pressure on the molten metal which is held in the tundish 80. As was discussed in connection with FIG. 1, the desired static pressure is generated in the metal source unit 20 by the tundish pressure control unit 24 of FIG. 1. Thus a positive pressure seal between the tundish 80 and the metal source unit 20 is a requisite to maintaining a desired static pressure on the molten metal in the tundish 80.

Referring back new to FIG. 1, the utility of the o-rings 86 can be even better understood when one considers how the metal spray apparatus 10 is initially set up and brought to operating conditions. In order to avoid any oxidation of the metal droplets in the plume 36, the spraying operation is preferably carried out in an inert gas atmosphere within the chamber 12. This inert gas atmosphere is produced by first drawing a vacuum in the chamber 12 and then backfilling the chamber 12 with an inert gas such as argon. During the drawing of the vacuum, it is necessary that the lower end 89 (FIG. 2) of the metal source unit 20 be removed from the chamber 12. If the lower end 89 were to be allowed to remain in the chamber 12 during this set-up stage, a vacuum could not be successfully produced because the unit 20 is not sufficiently leak resistant. Thus the chamber 12 is provided with a conventional gate valve (not shown) though which the lower end 89 of the metal source unit 20 is inserted after the chamber 12 is charged with argon at the desired ambient pressure. In order to assure that the apparatus 10 is an efficient manufacturing unit, it is necessary that the lower end 89 can be coupled easily and quickly with the tundish assembly 16. The o-ring 86 (FIG. 4) seal on the outer metal source adapter 84 (FIG. 4) allows for the desired expedient coupling. The lower end 89 simply slides into the outer metal source adapter 84.

Figure 5:
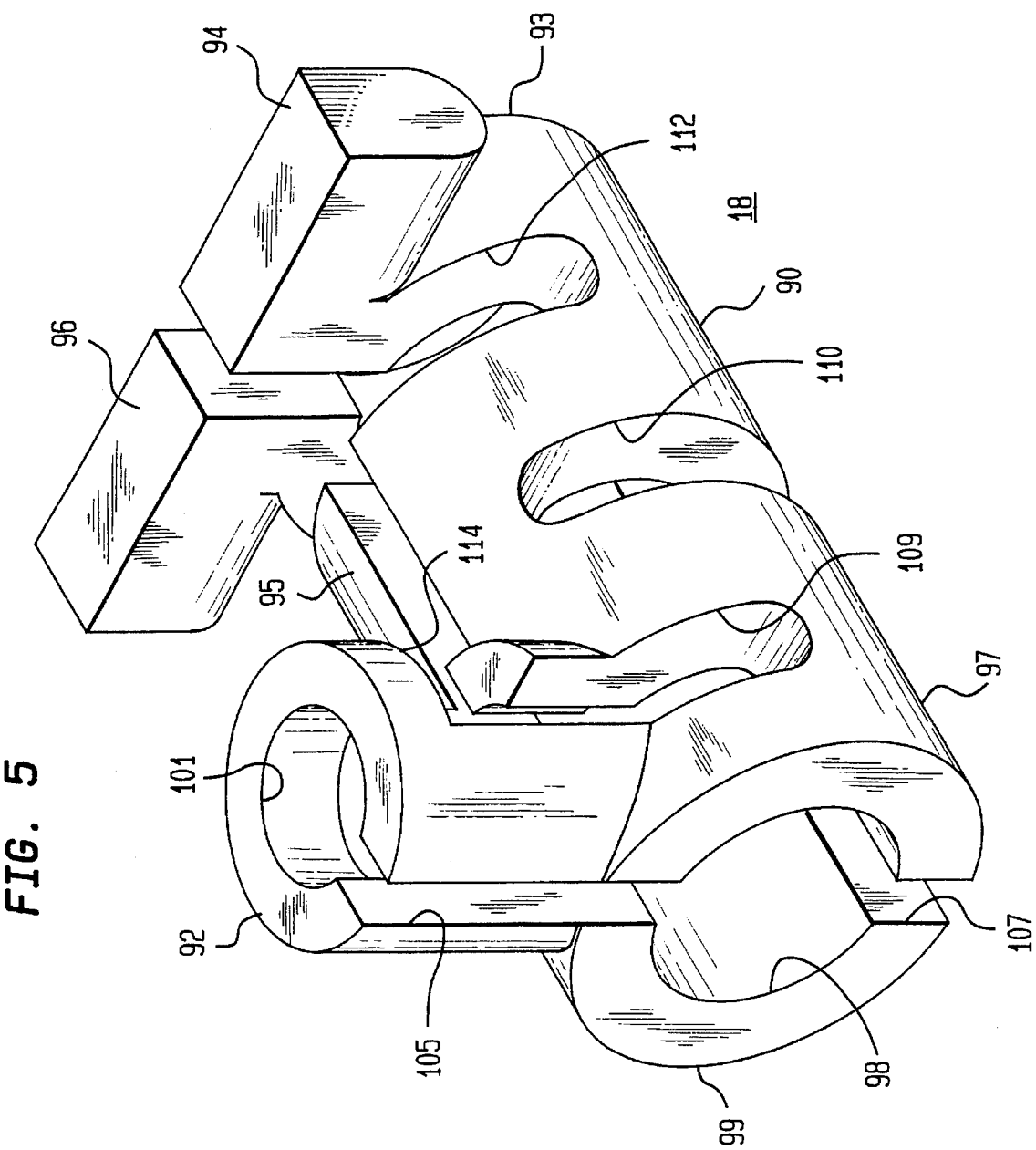
FIG. 5 shows a perspective view of a heater that is part of the apparatus of FIG. 1.

Referring now to FIG. 5 there is shown a detailed perspective view of the heater 18 employed in the apparatus 10.

The heater 18 is formed from a continuous piece of solid graphite. The heater 18 is shaped so that it comprises a nozzle heating portion 90, a tundish heating portion 92 and first and second power connectors 95 and 96, respectively. The heater 18 is formed in a serpentine configuration with grooves and cylindrical holes formed therein to produce a substantially uniform cross-sectional area of the graphite along a current path that extends from the first power connector 94 to the second power connector 96. The nozzle heating portion 90 and the tundish heating portion 92 are shaped basically like two hollow cylinders with intersecting axes. For purposes of clarity, the heater is designated to have an entrance end 93, a top side 95, a bottom side 97 and an exit end 99.

A cylindrical hole 98, large enough to accommodate the nozzle 14 (FIG. 1) is formed on an axis parallel to the nozzle heating portion 90. A cylindrical hole 101 large enough to accommodate the tundish assembly 16 (FIG. 1) is formed in the tundish heating portion 92 on a axis parallel with the tundish heating portion 92. A slot 105 extends through a wall of the tundish heating portion 92 on the exit end 99 of the heater 18. A slot 107 extends through the wall of the nozzle heating portion 90 along the entire bottom side 97 of the nozzle heating portion 90. First, second third and fourth transverse slots designated 109, 110, 112 and 114, respectively extend through the walls of the heater 18. The first transverse slot 109 extends through a portion of the wall of the tundish heating portion 92 which faces the entrance end 93 of the heater 18. The first transverse slot 109 also extends from a point approximately midway along the axis of the tundish heating portion 92 to a point that is approximately aligned with a central axis of the nozzle heating portion 90. The second transverse slot 110 extends from the bottom side 97 of the nozzle heating portion 90 to a point that is substantially aligned with the central axis of the nozzle heating portion 90. The third transverse slot 112 extends from the top side 95 of the nozzle heating portion 90 to a point that is substantially aligned with the central axis of the nozzle heating portion 90. The fourth transverse slot 114 extends through the wall of the tundish heating portion 92 on the side of that portion which faces the entrance end 93 of the heater 18. The fourth transverse slot 114 intersects with the first transverse slot 109.

This arrangement of slots and holes produces a path for electric current in the graphite of the heater 18 which has a substantially uniform cross-sectional area. The current path extends from the first power connector 95 down to the bottom side 97 between the entrance end 93 and the transverse slot 112. Then the current path goes to the top side 65 between the transverse slots 112 and 110. The current path then goes to the bottom side 97 between the transverse slots 110 and 109. The current path then goes into the tundish heating portion 92 between the slot 105 and the transverse slot 109. The current path proceeds around a top of the tundish heating portion 92 and down the far side of the slot 105. The current path follows a similar course on the far side of the heater 18 until the path terminates at the second power connector 96.

The sizes of the holes and slots are selected so that the resultant heater is comprised of graphite that has a substantially uniform cross-sectional area along the entire length of the current path. When electric current is introduced to the heater 18 through the power connectors 95 and 96, there is a substantially uniform voltage drop along the entire current path. This results in a substantially uniform temperature distribution around the entire volume of the heater 18.

This arrangement is particularly desirable in the operation of the metal spray apparatus 10 (FIG. 1) because a uniformity of temperature of the nozzle 14 (FIG. 1) and the tundish 80 (FIG. 2) is essential to achieving a uniformity of size in the droplets of liquid metal which the apparatus 10 produces.

If the tundish 80 and the nozzle 14 were heated with separate heaters, then there would be a need to use complex control systems to assure that the temperatures of both of the separate heaters remained the same. The unique design of the heater 18 permits the use of one simple current controller to control temperature of both the nozzle 14 and the tundish 80.

Figure 6:
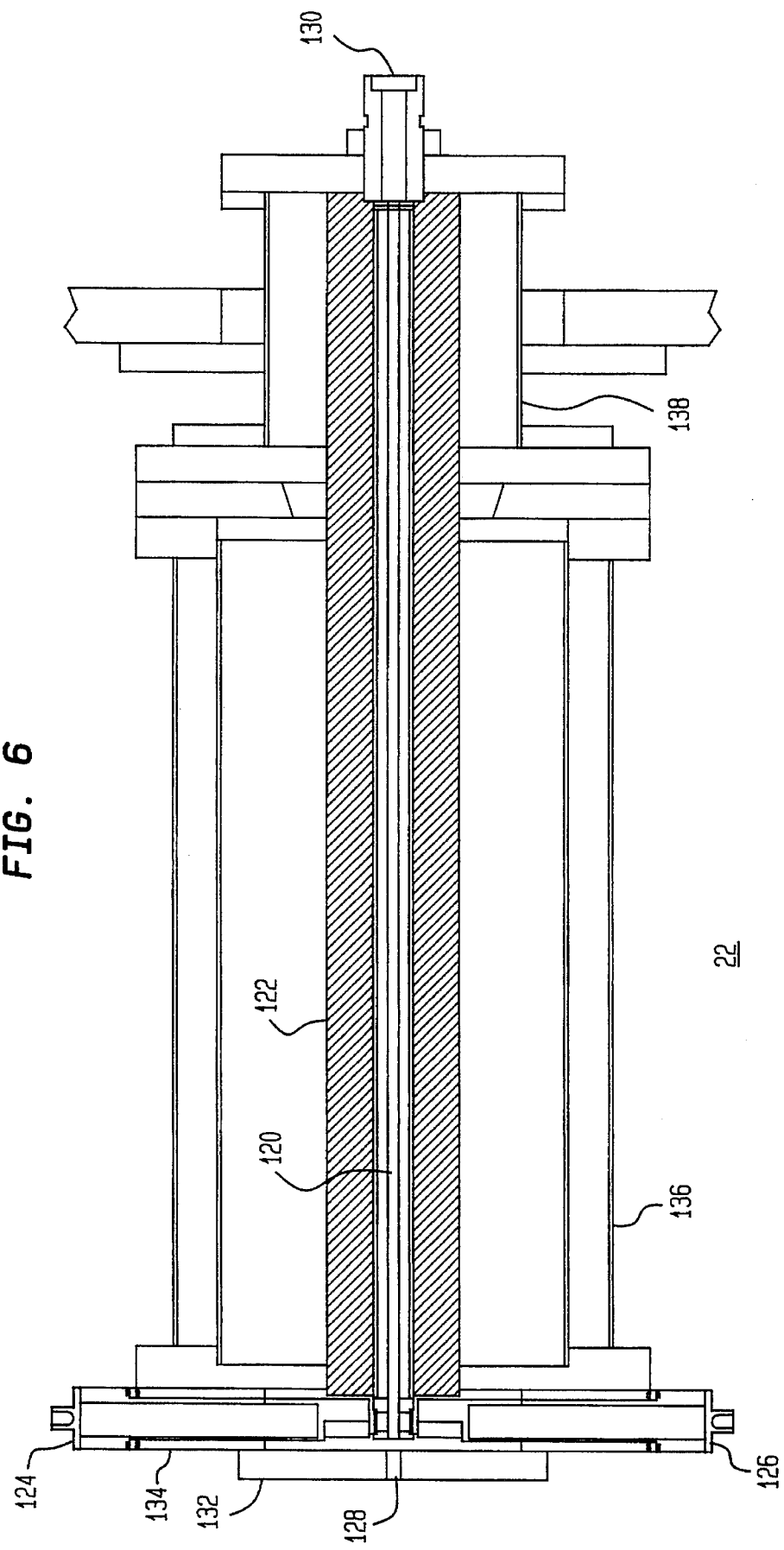
FIG. 6 is a sectional view of a gas heater portion of the apparatus of FIG. 1.

Referring now to FIG. 6 there is shown a cross-sectional view of the gas heater 22 of FIG. 1. The gas heater 22 comprises a resistance heating element 120, a cylinder of rigidized carbon felt insulation 122, two water-cooled electrodes 124 and 126, a gas inlet 128, a gas outlet 130, a water-cooled cover plate 132, an end plate 134, a water-cooled heater vessel 136 and a heater extension 138. The heating element 120 is supported by the end plate 134 within a cylindrical opening in the insulation 122. The element 120 and the insulation 122 are aligned with each other so that a substantially uniform annular space is developed along the length of the element 120. The annular space forms a passageway through which gas flows. The electrodes 124 and 126 are each coupled to one side of the element 120. Water cooling in the vessel 136, the electrodes 124 and 126, and the cover plate 132 prevents these items from melting during operation of the heater 22.

Figure 7:
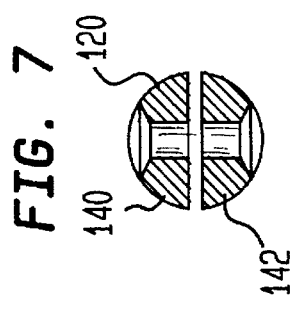
FIG. 7 is an end view of a heating element of the gas heater of FIG. 6.
Figure 8:
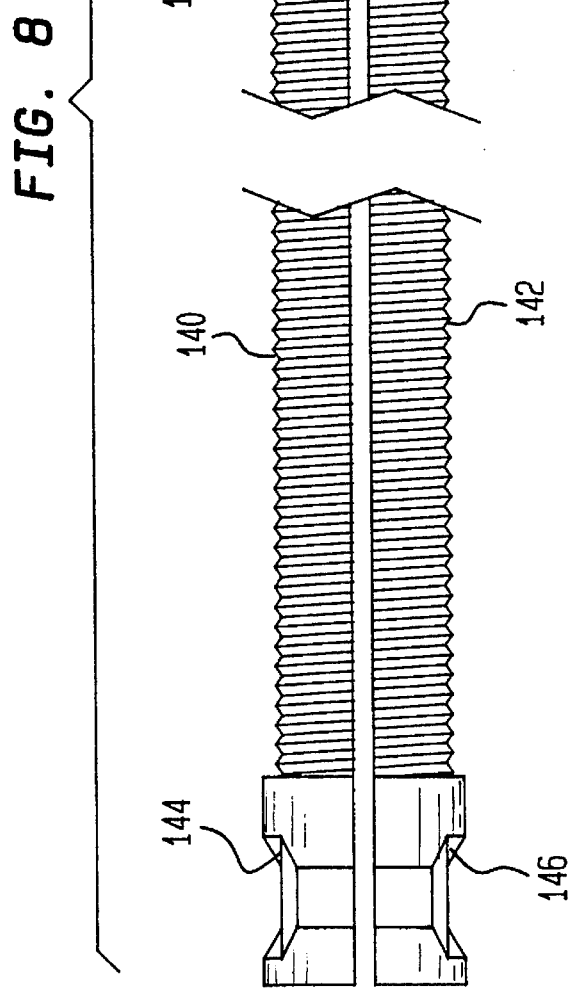
FIG. 8 is elevational view of the heating element of FIG. 7.

Referring now to FIGS. 7 and 8, there is shown a detailed side view and end view of the heater element 120 of FIG. 5. The element 120 is comprised a top leg 140 and a bottom leg 142. The legs 140 and 142 traverse almost the entire length of the element 120. Each of the legs 140 and 142 are provided with electrode attachment points 144 and 146, respectively. The legs 140 and 142 are interconnected at an end 148. It can be seen that the element 120 is essentially a solid cylinder with a horizontal slot formed along almost its entire length. The slot does not pass through the end 148. Thus the resulting structure of the element is a long U-shaped cylinder with a substantially uniform cross-sectional area. An outer surface of the element 120 is covered with threads 150 as shown in a detail bubble portion of FIG. 8. Materials such as graphite or a refractory metal such as molybdenum are suitable for construction of the element 120.

Referring back now to FIG. 6, it can be seen that in operation the gas heater 22 achieves a high temperature when low frequency, AC current is passed through the electrodes 24 and 126. A current path passes into the electrode 124, continues into and along the top leg 140 of the element 120. The current path continues around the end 148 of the element 20, then along the other leg 142 and finally into the electrode 126. Gas passes over the threaded surface of the element 120 in the annular opening between the element 120 and the insulation 122 of FIG. 6. The threads 150 produce turbulence in the gas, thus providing for an optimization of heat transfer from the element to the gas. The annular space between the element 120 and the insulation 122 is about 0.065 inches. The threads 150 are about 0.035 inch or greater in depth. This combination produces a virtually complete turbulence in the gas flow in the annular space.

As the gas passes along the length of the element 120, the gas becomes progressively hotter. In fact, when the gas reaches the end 148, the temperature of the gas can be as high as 2000 degrees centigrade.

The unique utility of the shape of the element 120 can be best understood when considering the high exit temperature of the heater 22. Both of the electrodes 124 and 126 are attached to the element 120 at an input end of the heater 22 where the gas temperature is relatively low. Thus the electrodes 124 and 126 are able to operate in temperature conditions in which they do not melt. If either of the electrodes were to be located near the output end of the heater 22, then the heater could not be operated at such a high temperature because such an electrode would melt if the electrode were not water cooled. However if the electrode were water cooled, then the exit gas temperature would be reduced. Therefore, it can be seen that the unique U-shaping of the element 120 provides for a gas heater that can be operated at heretofore unattainable output temperatures.

When the unique gas heater 22 of FIG. 6 is combined with the unique nozzle and tundish heater of FIG. 5, there is an extraordinary capability imparted to the spraying apparatus 10 of FIG. 1. Gas injected into the nozzle 14 can be heated to temperatures in excess of 2000 degrees centigrade. This extremely hot gas can undergo substantial heat losses during expansion in the nozzle 14 and still emerge from the nozzle 14 at a high enough temperature to provide a very hot carrier for metal droplets. Thus the droplets do not freeze during transit to the substrate. In this regard, the apparatus 10, is uniquely capable of operating with high pressures in the throat of the nozzle 14. High pressure in the throat of the nozzle 14, of course, permits the nozzle 14 to spray metal without aspiration. Consequently, the apparatus 10 is operable in a much wider range of gas flow and pressure conditions than those to which prior art metal spray equipment is limited.

Figure 9:
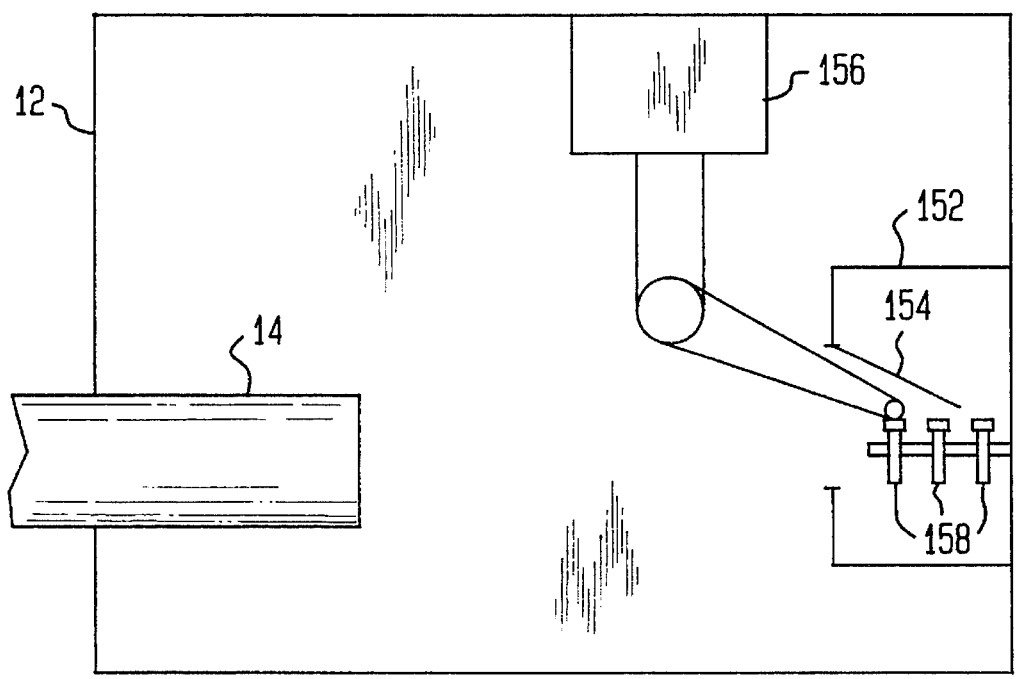
FIG. 9 is a symbolic representation of a portion of the apparatus of FIG. 1 showing one operational aspect thereof.
Figure 10:
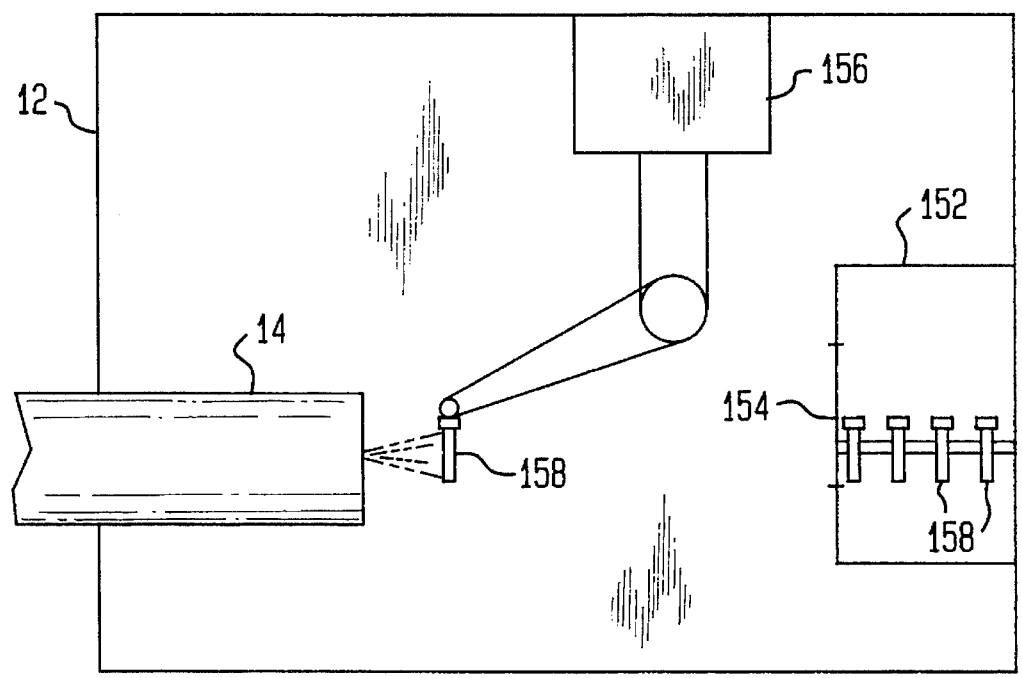
FIG. 10 is a symbolic representation of a portion of the apparatus of FIG. 1 showing another operational aspect thereof.

Referring now to FIGS. 9 and 10 there is shown, symbolically, an operational sequence of the metal spray apparatus 10. The nozzle 14 is shown projecting through the wall of the chamber 12. Attached to the chamber 12 there is a sub-chamber 152. The sub-chamber 152 is provided with an isolating door 154. A robotic unit 156 is mounted within the chamber 12. The robotic unit 156 is adapted to reach into the sub-chamber 152 through the door 154 and pick up a substrate or workpiece 158. After one of the workpieces 158 is engaged with the robotic unit 156, the unit moves the engaged workpiece 158 into position in front of the nozzle 14 as shown in FIG. 10. After the engaged workpiece 158 is in position in front of the nozzle 14, the spraying operation is started and the workpiece 158 is coated with a desired metal.

After the workpiece 158 is coated, the robotic unit 156 returns the coated workpiece 158 to the sub-chamber 152 as shown in FIG. 9. The robotic unit 94 then engages with one of the uncoated workpieces 158 and the above described process is repeated. In this way a plurality of the workpieces 158 can be coated without a need to open and recharge the chamber 12 with inert gas. Use of the sub-chamber 152 with its isolating door 154 permits each of the workpieces 158 to be independently coated without risk of cross-contamination. In other words, each of the workpieces 158 is coated separately and the workpieces 158 in the sub-chamber 152 are not subject to being undesirably contacted with overspray particles.

The apparatus 10 can also produce objects of near-net shape. A mold (not shown) with an impression of a desired shape can be used as the workpiece 158. The spray plume 36 is directed into the mold and the mold becomes coated with metal to fill the impression. When the solidified metal is removed from the mold, an object of the desired shape is obtained.

Figure 11:
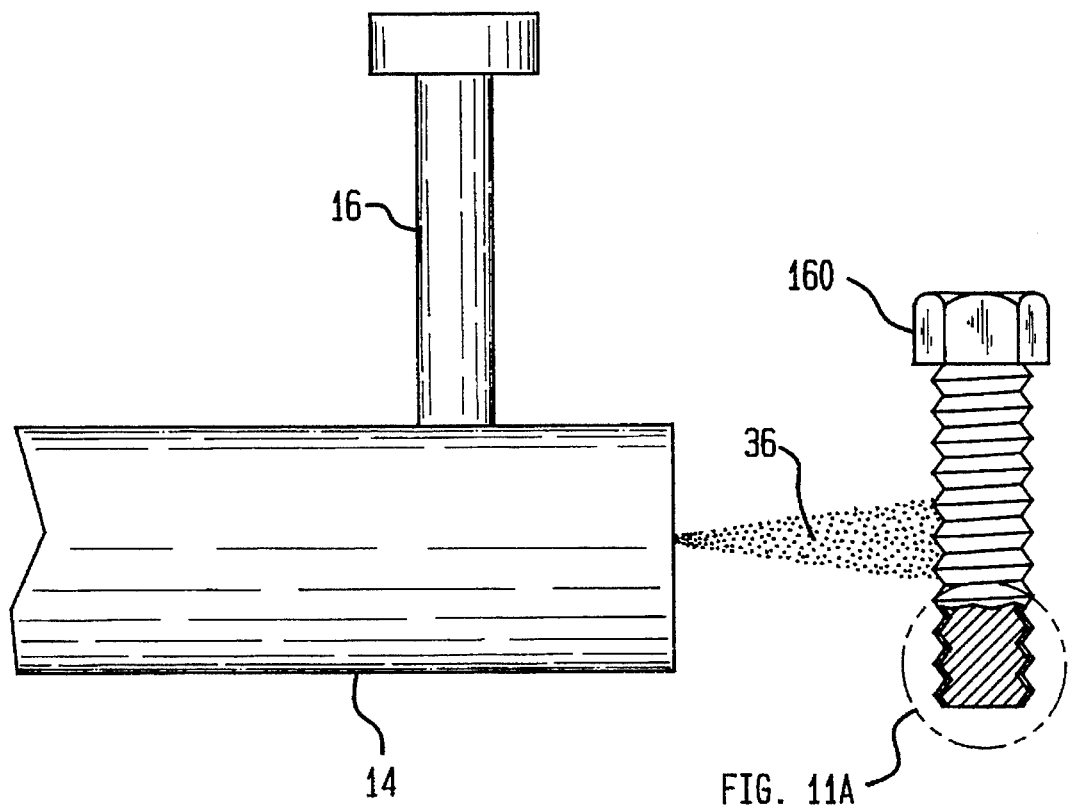
FIG. 11 is a symbolic representation of a method of producing objects in accordance with the present invention.

Referring now to FIG. 11 there is shown a particularly useful application of the metal spraying apparatus of FIG. 1 which is in accordance with the present invention. FIG. 11 show a threaded fastener 160 positioned in front of the nozzle 14. A portion of the fastener 160 is in the spray plume 36. The tundish assembly 16 is charged with a specialized molten metal known as a shape memory alloy (SMA).

In operation, the robotic unit of FIGS. 9 and 10 moves the fastener 160 vertically and rotationally within the spray plume 36 so that all of the threads of the fastener 160 are uniformly exposed to the spray plume 36. This results in the threads being coated with shape memory alloy.

Figure 11A:
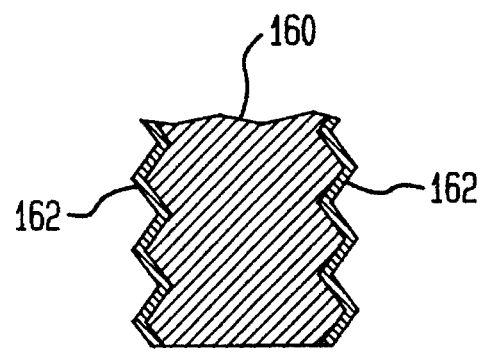
FIG. 11A is a partial cross-sectional view of a fastener of FIG. 11 showing a coating of Shape Memory Alloy thereon.

A coating 162 of the SMA is shown in FIG. 11A, which is a partially sectioned view of the fastener 160.

Shape memory alloys (SMA), such as those obtainable from TiNi Alloy Company, San Leandro, Calif., have unique characteristics. When an SMA is cold or below its transformation temperature, it has a very low yield strength and can be deformed quite easily into any new shape. However, when the material is heated above its transformation temperature, it undergoes a change in crystal structure which causes it to become hard and to return to its original shape.

These characteristics are used advantageously on the threaded fasteners 160. The fasteners 160 are coated with SMA to a coating thickness that results in an interference fit between the male threads of the fastener 160 and the female threads of the object into which the fastener is to be placed. This results in a distortion of the SMA coating when the fastener 160 is installed. This distortion is particularly useful when the fastener 160 is used to secure components that operate in a high temperature environment. As the component is placed into service where its temperature rises, e.g., engines, turbines, etc., the SMA undergoes a transition to a different crystal structure that has a much higher yield strength and attempts to restore itself to its original dimensions. This stress locks the fastener 160 in place. When the component cools, transition to the low temperature crystal occurs and the fastener can be readily removed.

Thus the fastener 160 operates at high temperatures with all the security of a rivet or weld, but at low temperatures, the fastener 160 operates with all the convenience of a bolt.

We have found that when the fasteners 100 are installed at temperatures below 35 degrees centigrade, they will develop a substantial locking stress at temperatures above 100 degrees centigrade. We have also found that when the spray plume 36 is comprised of droplets no greater in diameter than 100 microns then the fasteners 100 achieve a predictable and repeatable locking stress at high temperatures.

It is to be appreciated and understood that the specific embodiments of the invention are merely illustrative of the general principles of the invention. Various modifications may be made by those skilled in the art which are consistent with the principles set forth. For example, it is possible to apply coatings of shape memory alloy to threads of fasteners with electroplating techniques.

What is claimed is:

1. A threaded fastener comprising:

a threaded member and a coating of shape memory alloy on the threads of the member.

2. A male threaded fastener comprising:

a threaded base member having thread dimensions which are no larger than a corresponding opening in a female threaded opening into which the base member is to be inserted;

a coating applied to the threads of the base member, which coating has a thickness sufficient to produce an interference fit between the male threaded fastener and the female threaded opening into which the male threaded fastener is to be inserted; and the coating being comprised of a shape memory alloy.

3. A method of fastening a female threaded object into a desired location which location is intended to be exposed to temperatures above 100 degrees centigrade;

determining the inside diameter of the female threads;

coating threads of a male threaded fastener with a shape memory alloy so that the overall outside diameter of the coated threads exceeds the inside diameter of the female threads; and inserting the coated male threaded fastener into the female threaded object at a temperature below 35 degrees centigrade whereby the coating of shape metal alloy is distorted and will subsequently produce a locking stress on the female object when the female object is heated to a temperature above 100 degrees centigrade, whereby the fastener remains secure at said higher temperature but can be readily and repeatedly disassembled at said lower temperature.

4. A method of fastening a male threaded object into a desired location which location is intended to be exposed to temperatures above 100 degrees centigrade:

determining the outside diameter of the male threads;

coating threads of a female threaded fastener with a shape memory alloy so that the overall inside diameter of the coated threads is less than the outside diameter of the male threads; and inserting the male threaded object into the coated female threaded fastener at a temperature below 35 degrees centigrade whereby the coating of shape metal alloy is distorted and will subsequently produce a locking stress on the male threaded object when the object is heated to a temperature above 100 degrees centigrade, whereby the fastener remains secure at said higher temperature but can be readily and repeatedly disassembled at said lower temperature.

* * * * *